United States Patent
Wyatt (10) Patent No.: US 8,826,048 B2
(45) Date of Patent: Sep. 2, 2014

(54) REGULATING POWER WITHIN A SHARED BUDGET

(75) Inventor: David Wyatt, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 444 days.

(21) Appl. No.: 12/552,279

(22) Filed: Sep. 1, 2009

(65) Prior Publication Data

US 2011/0055596 A1    Mar. 3, 2011

(51) Int. Cl.
  *G06F 1/26* (2006.01)
  *G06F 1/32* (2006.01)
  *G06F 1/20* (2006.01)

(52) U.S. Cl.
  CPC .............. *G06F 1/206* (2013.01); *Y02B 60/1275* (2013.01); *G06F 1/325* (2013.01); *G06F 1/3203* (2013.01)
  USPC ............ 713/320; 713/300; 713/310; 713/340

(58) Field of Classification Search
  USPC ........ 713/300, 310, 320, 340; 714/4.12, 4.21, 714/10, 11, 13
  See application file for complete search history.

(56) References Cited

U.S. PATENT DOCUMENTS

| | | | |
|---|---|---|---|
| 5,339,445 A | 8/1994 | Gasztonyi | |
| 5,452,277 A | 9/1995 | Bajorek et al. | |
| 5,760,636 A | 6/1998 | Noble et al. | |
| 5,796,934 A * | 8/1998 | Bhanot et al. ................ | 714/4.12 |
| 5,812,860 A | 9/1998 | Horden et al. | |
| 5,825,678 A | 10/1998 | Smith | |
| 5,991,883 A | 11/1999 | Atkinson | |
| 5,996,083 A | 11/1999 | Gupta et al. | |
| 6,002,409 A | 12/1999 | Harkin | |
| 6,047,248 A | 4/2000 | Georgiou et al. | |
| 6,076,171 A | 6/2000 | Kawata | |
| 6,134,673 A * | 10/2000 | Chrabaszcz ..................... | 714/13 |
| 6,141,762 A | 10/2000 | Nicol et al. | |
| 6,208,350 B1 | 3/2001 | Herrera | |
| 6,212,645 B1 | 4/2001 | Tjandrasuwita | |
| 6,230,281 B1 * | 5/2001 | Brodfuhrer et al. ......... | 714/4.21 |
| 6,425,086 B1 | 7/2002 | Clark et al. | |
| 6,509,788 B2 | 1/2003 | Naffziger et al. | |
| 6,510,525 B1 | 1/2003 | Nookala et al. | |
| 6,549,243 B1 | 4/2003 | Takashimizu et al. | |
| 6,549,802 B2 | 4/2003 | Thornton | |

(Continued)

FOREIGN PATENT DOCUMENTS

| | | |
|---|---|---|
| EP | 0632360 | 1/1995 |
| EP | 0794481 A2 | 9/1997 |
| EP | 0991191 A2 | 4/2000 |

OTHER PUBLICATIONS

Kasichayanula, Kiran. Power Aware Computing on GPUs. Masters Thesis. May 2012.*

(Continued)

*Primary Examiner* — Matthew D Spittle (57) ABSTRACT

Metrics representing a combined measure of power used by a central processing unit (CPU) and power used by a graphics processing unit (GPU) are compared to a shared supply power and/or shared thermal power budget. A state of the CPU and a state of the GPU are regulated by the power management system to maintain the metrics within the shared supply power and/or thermal power budget for the purpose of managing the components to meet platform power supply, and cooling, constraints and design requirements.

23 Claims, 8 Drawing Sheets

(56) References Cited

U.S. PATENT DOCUMENTS

| | | | |
|---|---|---|---|
| 6,574,739 B1 | 6/2003 | Kung et al. | |
| 6,636,976 B1 | 10/2003 | Grochowski et al. | |
| 6,665,802 B1 | 12/2003 | Ober | |
| 6,691,236 B1 | 2/2004 | Atkinson | |
| 6,701,272 B2 | 3/2004 | Cooper et al. | |
| 6,721,892 B1 | 4/2004 | Osborn et al. | |
| 6,768,659 B2 | 7/2004 | Gillingham et al. | |
| 6,907,535 B2 | 6/2005 | Fang | |
| 6,910,139 B2 | 6/2005 | Ishidera | |
| 6,928,559 B1 | 8/2005 | Beard | |
| 6,944,229 B2 | 9/2005 | Son et al. | |
| 6,947,865 B1 | 9/2005 | Mimberg et al. | |
| 6,990,594 B2 | 1/2006 | Kim | |
| 6,996,441 B1* | 2/2006 | Tobias | 700/44 |
| 7,017,060 B2 | 3/2006 | Therien et al. | |
| 7,043,557 B2 | 5/2006 | Mesarina et al. | |
| 7,043,649 B2 | 5/2006 | Terrell, II | |
| 7,089,459 B2 | 8/2006 | Therien | |
| 7,100,013 B1 | 8/2006 | de Waal | |
| 7,100,061 B2 | 8/2006 | Halepete et al. | |
| 7,203,942 B2 | 4/2007 | Lafruit et al. | |
| 7,243,243 B2* | 7/2007 | Gedeon | 713/300 |
| 7,256,788 B1 | 8/2007 | Luu et al. | |
| 7,331,532 B2* | 2/2008 | Currie et al. | 236/49.3 |
| 7,337,339 B1* | 2/2008 | Choquette et al. | 713/320 |
| RE40,473 E | 8/2008 | Osborn et al. | |
| 7,426,649 B2* | 9/2008 | Brittain et al. | 713/320 |
| 7,451,332 B2* | 11/2008 | Culbert et al. | 713/320 |
| 7,467,059 B2 | 12/2008 | Therien et al. | |
| 7,515,996 B2 | 4/2009 | Wald | |
| 7,529,948 B2* | 5/2009 | Conroy et al. | 713/300 |
| 7,653,825 B1 | 1/2010 | White et al. | |
| 7,698,575 B2 | 4/2010 | Samson | |
| 7,802,120 B2* | 9/2010 | Conroy et al. | 713/340 |
| 7,804,435 B2 | 9/2010 | Sadowski et al. | |
| 8,051,310 B2 | 11/2011 | He et al. | |
| 8,060,761 B2* | 11/2011 | Lai et al. | 713/300 |
| 8,126,058 B2 | 2/2012 | Tseng et al. | |
| 8,132,030 B2 | 3/2012 | Yermalayeu et al. | |
| 8,700,925 B2 | 4/2014 | Wyatt | |
| 2001/0044909 A1 | 11/2001 | Oh et al. | |
| 2002/0029374 A1 | 3/2002 | Moore | |
| 2002/0101257 A1 | 8/2002 | Kawahara et al. | |
| 2002/0143488 A1 | 10/2002 | Cooper et al. | |
| 2003/0210271 A1 | 11/2003 | King | |
| 2005/0049729 A1 | 3/2005 | Culbert et al. | |
| 2005/0288886 A1 | 12/2005 | Therien et al. | |
| 2007/0049134 A1* | 3/2007 | Conroy et al. | 439/894 |
| 2007/0050647 A1* | 3/2007 | Conroy et al. | 713/300 |
| 2007/0266385 A1 | 11/2007 | Flautner et al. | |
| 2008/0162965 A1 | 7/2008 | Marinas et al. | |
| 2009/0099807 A1 | 4/2009 | Therien et al. | |
| 2009/0100277 A1 | 4/2009 | Lai et al. | |
| 2009/0210740 A1 | 8/2009 | Huang et al. | |
| 2011/0055597 A1* | 3/2011 | Wyatt | 713/300 |

OTHER PUBLICATIONS

Arnau et al. Boosting Mobile GPU Performance with a Decoupled Access/Execute Fragment Processor. IEEE. 2012.*

Huang et al. On the Energy Efficiency of Graphics Processing Units for Scientific Computing. IEEE. 2009.*

Newton, Harry, "Newton's Telecom Dictionary", 1998, Flat Iron Publishing, p. 465.

Lorch, J.R. et al, "Software Strategies for Portable Computer Energy Management" IEEE Personal Communications, IEEE Communications Society, US vol. 5, No. 3, Jun. 1, 1997, p. 60-73, ISSN 1070-9916.

Melear, C. "Hardware and Software Techniques for Power Conservation in Portable Devices" Wescon Conference IEEE Center, Hoes Lane, USA Sep. 27, 1994, pp. 453-461, XP0000532610, ISSN 1044-6036.

Dubois, Y.A. et al. "ASIC Design Considerations for Power Management in Laptop Computers" Euro ASIC 91 Paris France, May 27-31, 1991, Los Alamitos, CA, USA, IEEE Comput. Soc. US, pp. 348-351, XP010024394, ISBN 0/8186-2185-0.

Young, R. et al. "Adaptive Clock Speed Control for Variable Processor Loading" Motorola Technical Developments, Motorola Inc. Schaumberg, IL, USA, vol. 15, May 1, 1992, pp. 43-44, XP000306138, ISSN 0887-5286.

* cited by examiner

REGULATING POWER WITHIN A SHARED BUDGET

RELATED UNITED STATES PATENT APPLICATION

This application is related to U.S. patent application Ser. No. 12/552,284 by D. Wyatt, filed concurrently with this application, and entitled "Regulating Power Using A Fuzzy Logic Control System," assigned to the assignee of the present invention, and hereby incorporated by reference in its entirety.

BACKGROUND

Computer systems typically use evacuative cooling systems for temperature control. Using one or more fans, outside air is drawn in through vents, pulled through and around the internal components, over a heat exchanger assembly, and then is pushed out through other vents. Heat generated by the internal components—in particular, the central processing unit (CPU) and graphics processing unit (GPU)—is conducted by heat pipes into the heat exchanger assembly and thereby removed from the system.

In most systems, the CPU and GPU constitute the largest sources of heat loads. For example, in a typical notebook device, the CPU and GPU together can contribute up to 70 watts of thermal power, and up to 100 watts in a high end configuration. The next largest contributor is usually the memory subsystem, which generally peaks at around eight watts. The total system cooling capability of a typically dimensioned notebook is about 85 watts, and so the majority of the cooling capability is directed into the heat exchanger system for the CPU and GPU. Thus, the CPU and GPU present the largest thermal power management challenge, affecting system design, form factors, and component purchasing decisions. In other words, a device's target form factor and implied cooling capabilities can limit a designer's choice of GPU due to assumptions that need to be made about the worst-case thermal effects of both the GPU and CPU.

If the thermal contributions of the computer system's internal components are not mitigated, then the temperatures of those components can increase until either the components self-throttle in order to avoid exceeding their respective temperature limit, or the inability to adequately remove heat from the system causes one or more components to overheat. Overheating can damage internal components, and heat conduction and radiation into the device's chassis and skin (housing) may elevate surface temperatures to the point where the device feels uncomfortably hot to a user.

SUMMARY

According to embodiments of the present invention, a closed loop thermal management system implements a single, shared power budget for the largest thermal contributors—namely, the CPU and GPU. The budget may be a shared thermal power budget, a shared supply power budget, or a combined use of both the shared thermal power budget and the shared supply power budget.

By focusing the solution on the CPU and GPU, fewer sensors are needed and consequently costs can be reduced. Also, embodiments of the thermal management system are simplified relative to conventional systems, so that they can be executed on-chip (e.g., in a system management unit or power management unit on the GPU) in microcode instead of in the CPU or in an embedded controller. Furthermore, profiling the computer system's responses and thermal characteristics (e.g., thermal resistance and thermal time constants) is simplified.

Embodiments according to the present invention can utilize, for example, thermal energy (integrated power) over a flexible time interval (e.g., a sliding window of time) as the metric of interest rather than simply using only power or temperature, although power and temperature thresholds as well as other thresholds are supported. Other metrics can be utilized. By tracking the accumulation of power over time, the thermal management system can readily accommodate faster power transients (spikes) while also mitigating sustained heat loads.

In one embodiment, the integral of the CPU and GPU power contributions, or the integral sum of those contributions, is compared to the budget. If the budget is exceeded, then the CPU and/or GPU can be "throttled"—for example, the power-performance state (the voltage-frequency operating point, or p-state) of the CPU and/or GPU can be adjusted depending on the control policy in place. For example, one control policy may be GPU-centric, favoring the GPU such that the speed of the CPU but not the GPU is reduced when the budget is exceeded, while another control policy may favor the CPU over the GPU. Other types of control policies can also be instituted.

The control system can also determine predicted future thermal power loads—for example, the expected maximum thermal power generation based on knowledge of current workloads, utilization, and p-states. Using such information, the speed of cooling/exhaust fan(s) can be reduced, thereby reducing acoustic levels and improving system ergonomics. For example, the cooling fan's acoustic footprint may proportional to the fan speed, and the fan speed can be reduced to optimize acoustics if the power metric is less than the budget.

Furthermore, the inventive thermal management system can detect scenarios in which the CPU and/or GPU are wasting power, and consequently can proactively limit wasted power without necessarily limiting performance. For example, a priori application profiling information can be used to identify a known wasteful application, and driver loading information can be used to detect when that application is executing. The application profiling information can be used to identify when the speed or p-state of the CPU or GPU can be limited without significantly affecting performance, visual experience, or quality. This also has the effect of preserving battery life.

Embodiments according to the invention can be implemented in conjunction with or in lieu of legacy thermal management systems. In one embodiment, the inventive thermal management system performs a handshake with the legacy system before taking control. The inventive system can periodically send signals to the legacy system to indicate that the inventive system remains functional and in control.

In one embodiment, the inventive thermal management system uses fuzzy logic control, although classical proportional control may instead be utilized. In a proportional control system, the amount of control or adjustment is proportional to the error (e.g., the amount by which the budget is exceeded). A fuzzy logic control system provides more flexibility, relying on the use of rules that generalize system behavior. Also, relative to a proportional control system, a fuzzy logic control system is more likely to produce the proper response even with less accurate sensor data or little or no calibration.

By controlling and limiting the combined, sustained contributions of the CPU and GPU, the thermal solution can be reduced to less than the sum of the individual thermal design power or point (TDP) of those components; the power contributions of both the CPU and GPU are dynamically limited so that the components, in combination, do not exceed the shared cooling capability of the thermal solution. Consequently, a higher performance GPU can be utilized in systems not otherwise designed to support the higher power requirement of such a GPU, or a GPU can be introduced into a system not normally designed with discrete graphics capability. Alternatively, all things being equal, the size of the computer system (e.g., its form factor) can be reduced.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE INVENTION

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "comparing," "sending," "polling," "receiving," "regulating," "using," "accessing," "determining," "evaluating," "selecting," "executing" or the like, refer to actions and processes (e.g., flowcharts 800 and 900 of FIGS. 8 and 9, respectively) of a computer system or similar electronic computing device or processor (e.g., systems 200 and 300 of FIGS. 2 and 3, respectively). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-usable medium, such as program modules, executed by one or more computers or other devices. By way of example, and not limitation, computer-usable media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Regulating Power within a Shared Budget

Figure 1:
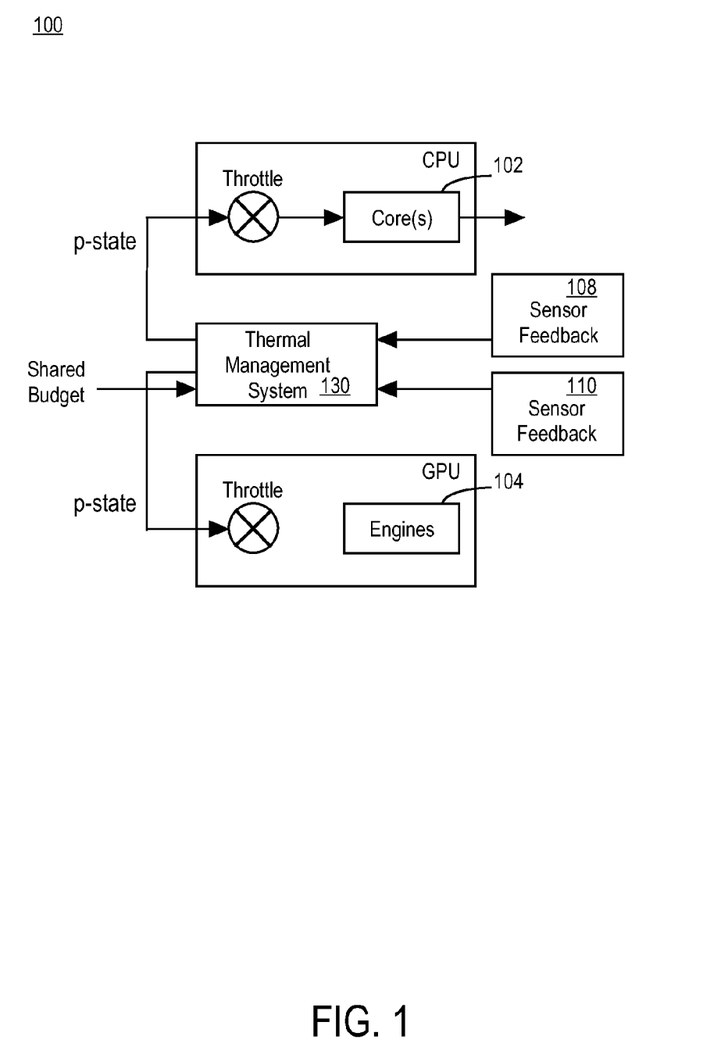
FIG. 1 is a block diagram of a thermal control system according to an embodiment of the invention.

FIG. 1 is a block diagram that provides an overview of a control system 100 according to an embodiment of the invention. The control system 100 is a closed loop feedback control system with two "plants"—a central processing unit (CPU) 102 and a graphics processing unit (GPU) 104 (in the context of a control system, a "plant" refers to the set of elements for a particular process or operation, with fixed inputs and producing a given output). In the example of FIG. 1, the inputs to the CPU 102 and the GPU 104 identify a power performance state (a voltage-frequency operating point, or p-state) for each. Feedback from the sensors 108 and 110 is provided to the inventive thermal management system 130. As will be described in greater detail herein, the thermal management system 130 compares the integral of the CPU and GPU power contributions, or the integral sum of those contributions, to a single, shared power budget (the budget itself is actually an integral value). If the budget is exceeded, then the CPU 102 and/or GPU 104 can be throttled—for example, the p-state of the CPU and/or GPU can be adjusted (up or down) depending on the control policy in place.

Figure 2:
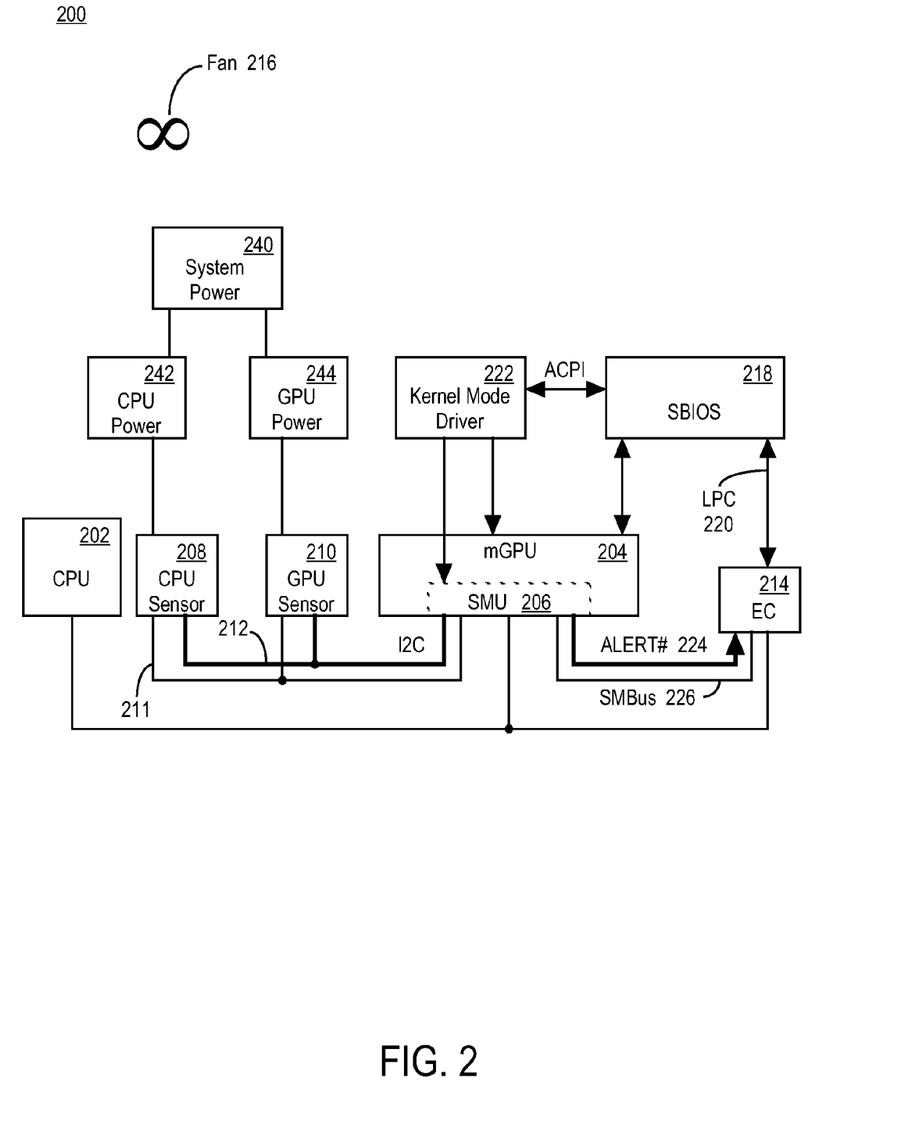
FIG. 2 is a functional block diagram of an example of a platform or system upon which embodiments according to the invention can be implemented.

FIG. 2 is a functional block diagram of an example of a platform or system 200 upon which embodiments according to the invention can be implemented. Only selected hardware and software elements are shown; the system may include other elements not shown or described. The system 200 may be implemented as part of a computer system, such as but not limited to a notebook or nettop type of device.

The system 200 includes a CPU 202 and a GPU 204. In the example of FIG. 2, the GPU 204 is a motherboard GPU (mGPU), or integrated GPU. The GPU 204 incorporates an on-chip system management unit (SMU) 206 that can be implemented in hardware, as a microcontroller, for example. The SMU 206 has access to and can control the CPU power sensor 208 and the GPU power sensor 210.

Because thermal power can be approximated from power consumption, the sensors 208 and 210, in one embodiment, read CPU power and GPU power levels directly from the power supply rails (e.g., on the power supply paths between the voltage regulator and the CPU and GPU). More specifically, in the embodiment of FIG. 2, a shared power supply 240 provides power to a CPU power supply 242 and a GPU power supply 244; the power sensors 208 and 210 measure power from the power supplies 242 and 244 to the CPU and GPU, respectively. The amount of power supplied by the CPU power supply 242 and the GPU power supply 244 can be used to specify a shared power supply power budget.

In the FIG. 2 embodiment, the sensors 208 and 210 are smart or intelligent sensors, having functionality beyond simply measuring power. For example, as will be further described, the sensors 208 and 210 can have the capability to determine whether the monitored power has exceeded a threshold value and, if so, can send an event signal over the event line 211 to the SMU 206. Processing of the data can also be performed, at least to some extent, by the smart sensors in order to reduce the amount of data traffic on the bus 212.

In response to an event signal, the SMU 206 can poll the sensors 208 and 210 to retrieve their data through the bus 212, which may be an I2C (Inter-Integrated Circuit) bus. The SMU 206 can then compute an integrated value of power over a flexible time interval (e.g., a sliding window of time), unless this functionality is provided by the sensors themselves. In this manner, the sensors 208 and 210 can be polled in real time using reduced amounts of CPU and system bandwidth.

Although not shown in FIG. 2, the system 200 can include other sensors, particularly temperature sensors. The temperature sensors can be situated to measure the temperatures of the CPU 202 and GPU 204, other internal components, and the skin (surface) temperature of the device incorporating the system 200. These other sensors can be coupled to the embedded controller (EC) 214 via a respective event line and a respective data bus (e.g., a system management bus, SMBus).

In the embodiment of FIG. 2, the EC 214 interfaces with the system BIOS (basic input/output system, SBIOS) functional block 218 via a low pin count (LPC) bus 220. The SBIOS 218 interfaces with the kernel mode driver functional block 222 according to the ACPI (Advanced Configuration and Power Interface) specification.

The EC 214 and SBIOS 218 together provide basic thermal control including control of the temperature sensors and a fan 216 (there may be multiple fans). The speed of the fan 216 can be adjusted such that it can be sped up or slowed down. The EC 214 and SBIOS 218 constitute elements of a legacy thermal control system. The inventive thermal management system 130 (FIG. 1) is not necessarily intended to replace the legacy thermal control system; instead, the thermal management system 130 and the legacy thermal control system can work cooperatively—but under control of the thermal management system 130—to allow enhanced software control (e.g., the ability to more intelligently set thermal control policies for the CPU and GPU and to control cross-influence) and to increase system robustness.

Before taking control, the thermal management system 130 performs a handshake with the legacy control system, so that the legacy control system will relax its thresholds in deference to those implemented by the system 130. For example, a cookie (in general, a private value known only to the system 130 and the legacy system) can be exchanged. A watchdog timer (not shown) is maintained between the system 130 and the legacy system, so that the legacy system can detect if the system 130 is no longer functional and reinstate the more conservative legacy thermal controls. However, the thermal management system 130 can be implemented autonomously. In either case, the thermal management system 130 can be implemented using existing system interfaces.

Elements of the thermal management system 130 (FIG. 1) can be implemented across the various blocks described above. In the FIG. 2 embodiment, the thermal management system 130 runs in the kernel mode driver 222 and/or the on-chip SMU 206, in conjunction with the basic thermal control provided by the EC 214 and the SBIOS 218.

The thermal management system 130 collects data from the sensors 208 and 210 that are connected to the SMU 206 via the I2C bus 212. In general, the SMU 206 can identify when a threshold is crossed and can read data from the sensors 208 and 210 through the bus 212; in one embodiment, the SMU 206 reads data in response to an event signal sent by the sensors. Processing of the sensor data can be done by the sensors themselves or by the SMU 206, to reduce the amount of overhead on the EC 214. When data for the EC 214 is available, the SMU 206 can send an alert 224 to the EC 214, which can read the data via the SMBus 226. The EC 214 can then throttle the CPU 202 and/or GPU 204 if a shared budget limit is exceed, as described in conjunction with FIGS. 4A, 4B, and 4C, below. Thus, instead of consuming CPU bandwidth and impacting system performance, the thermal management system 130 has the benefit of low overhead.

Figure 3:
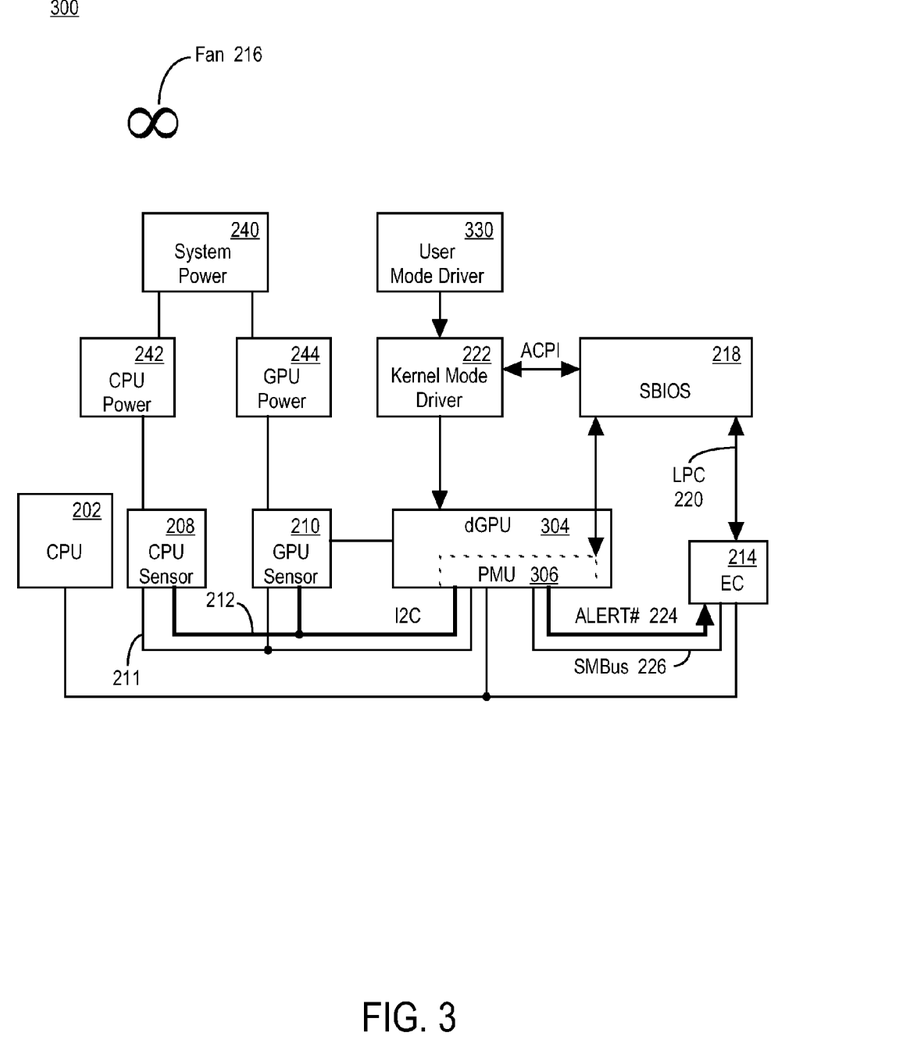
FIG. 3 is a functional block diagram of another example of a platform or system upon which embodiments according to the invention can be implemented.

FIG. 3 is a functional block diagram of another example of a platform or system 300 upon which embodiments according to the invention can be implemented. Only selected hardware and software elements are shown; the system may include other elements not shown or described. The system 300 may be implemented as part of a computer system, such as but not limited to a notebook or nettop type of device.

A difference between the system 200 of FIG. 2 and the system 300 is that the latter utilizes a discrete GPU (dGPU) 304, which may be implemented on a video card. The GPU 304 incorporates an on-chip power management unit (PMU) 306, which can be implemented in hardware, as a microcontroller, for example.

With regard to thermal management, elements in FIG. 3 have, in general, the same functionality as similarly named elements in FIG. 2. Also, the PMU 306, in general, performs the same thermal management functions as those associated with the SMU 206 of FIG. 2. However, in the FIG. 3 embodiment, the system includes a user mode driver 330 in addition to the kernel mode driver 222. Accordingly, the thermal management system 130 runs in the kernel mode driver 222, the user mode driver 330, and/or the on-chip PMU 306.

Figure 4A:
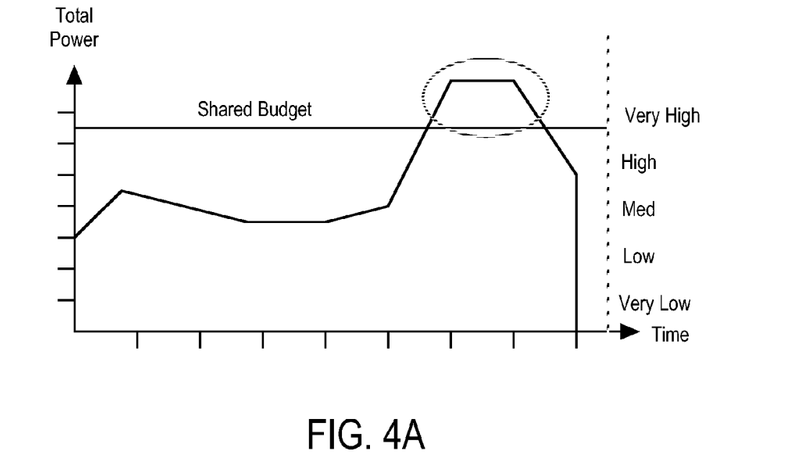
FIGS. 4A, 4B, and 4C are examples of integrated power values versus time for a combination of a CPU and GPU, a CPU, and a GPU, respectively, in an embodiment according to the invention.
Figure 4B:
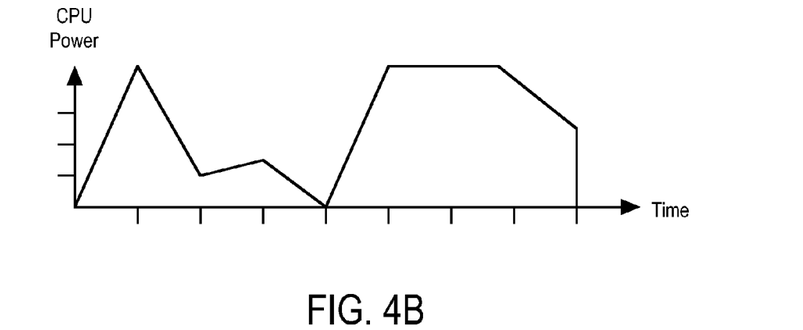
Figure 4C:
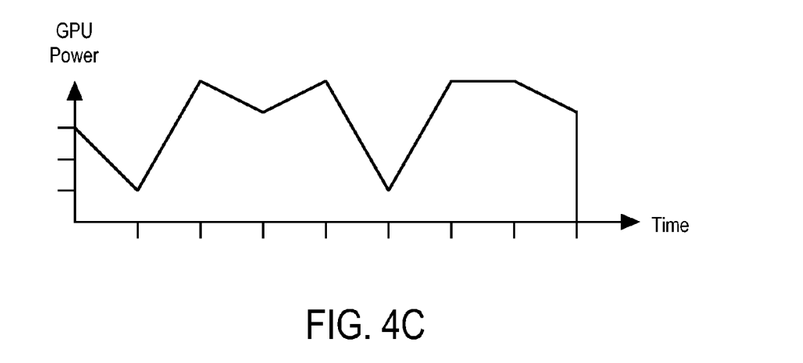

The operation of the thermal management system 130 is described in conjunction with the examples of FIGS. 4A, 4B, and 4C. CPU power and GPU power are measured over time using the power sensors 208 and 210 (FIGS. 2 and 3), respectively. Instantaneous values of CPU and GPU power can also be measured. The integral value of power (the measured power over a window of time) can be determined (computed) in any of a variety of ways. For example, power measurements taken over a window of time can be averaged, and the average can be multiplied by the length of the window. The integrated power value is determined for sliding, overlapping windows of time. FIGS. 4B and 4C show examples of the integrated power value as a function of time for the CPU and the GPU, respectively—each vertical line in the figures represents an integrated value for a sample period (a particular window in time). FIG. 4A shows the total integrated power for the CPU and the GPU; that is, FIG. 4A represents the sum of the values in FIGS. 4B and 4C.

An advantage associated with the use of integrated power values is that power spikes (in general, fast transients) will be accounted for in the integrated values. Components do not heat or cool instantaneously; they have relatively long thermal time constants that have a dampening effect. Thus, advantageously, the thermal management system 130 will not respond to an isolated power spike; bursts in performance that might exceed thermal parameters are permitted provided that the burst is not sustained. However, the thermal management system 130 will respond if the aggregate effect of bursts within a sample period causes the total integrated power to exceed the budget. In other words, the thermal management system 130 is more tolerant of bursty performance without impacting the ability of the thermal management system to intercede when needed.

The information represented in FIGS. 4A-4C can also be used to determine a moving average and a rate of change, which in turn can be used to predict integrated power values, and optionally to predict temperatures, for future time periods.

FIG. 4A also shows a single, shared budget that is applied to both the CPU and GPU. The budget may be a shared thermal power budget, a shared supply power budget, or a combined use of both the shared thermal power budget and the shared supply power budget.

In the example of FIG. 4A, the budget is constant over time. In actual practice, the budget may vary with time. In general, the budget may be changed in response to any of a variety of monitored parameters or due to changes in the monitored system. For instance, the budget may change dynamically as a result of changing fan speed(s), or due to changes in ambient temperature or skin temperature, or due to the influence of other components in the computer system that preheat the circulating air before it reaches the heat exchanger (in an evacuative cooling system).

The budget itself is an integral value. If the budget is a constant value, then the budget is simply that value times the length of each sliding window of time. If the budget is dynamic, then the budget is the integral of the budget versus time for each sliding window of time.

For a given ambient temperature and at a point in time, the budget can be determined by the SBIOS 218 or the EC 214 (FIGS. 2 and 3) using the following equation:

$$Budget = (Max - Min) * Fan/100 + Min;$$

where "Max" is the maximum cooling power (in watts) with full (100 percent) fan speed at the given ambient temperature, "Min" is the minimum cooling power (in watts) with minimum (zero percent) fan speed at the given ambient temperature, and "Fan" is the fan speed expressed as a percentage of full speed. Changes in the budget can be conveyed to the thermal management system 130 (FIG. 1) via the interfaces between the EC 214 and SBIOS 218 and the drivers 222 and 330 (FIGS. 2 and 3).

If the total integrated power remains below the budget, then the CPU and GPU are allowed to continue to operate in their current state (e.g., their current p-state). If the total integrated power exceeds the budget, as shown in the circled portion of FIG. 4A, then the state of either or both the CPU and GPU is adjusted, depending on the control policy in place.

The use of integrated power, instead of temperature or simply power, and the use of a single, shared power budget provide a number of advantages. As mentioned above, components do not heat or cool instantaneously; they have relatively long thermal time constants. Therefore, managing using only temperature or power can be disadvantageous because relatively long periods of active cooling (e.g., increased fan speed, resulting in a noisier system) or passive cooling (e.g., CPU throttling, resulting in reduced performance) may be prescribed unnecessarily in order to produce a noticeable change. Consequently, drastic and choppy changes in the user's experience may be induced as the system alternately overshoots and undershoots the target temperature. The inventive power management system avoids these disadvantages—since a rise in power precedes a rise in temperature, and since the integrated power value provides an indication of sustained higher power levels, then by measuring and monitoring the total integrated power and detecting when it exceeds the budget, it is possible to predict further thermal excursions and to adjust the CPU state and/or the GPU state accordingly.

Furthermore, in order to provide satisfactory thermal management using power and/or temperature, conventional control systems require detailed characterization of each platform's thermal resistance and thermal time constants. Accumulation of such data can be burdensome, requiring complex tools to inject thermal transients into a test system and to model and analyze thermal responses. The inventive power management system avoids these disadvantages; it is not necessary to precisely characterize the system/platform, especially when the inventive system employs fuzzy logic control, as described further below. In other words, the thermal management system 130 (FIG. 1) is more tolerant of less precise thermal parameters without adversely impacting the ability of the thermal management system to control temperature within design limits.

Also, as noted previously herein, the power sensors 208 and 210 (FIGS. 2 and 3) may experience fast spikes that are not relevant or require no action unless they are of a sustained nature. By utilizing power over time, trending, and averaging instead of instantaneous fluctuations in sensor data, the amount of data traffic can be significantly reduced.

According to embodiments of the invention, a variety of different control policies can be defined, each having a different goal or priority or aimed at achieving a user's particular preferences. For example, a GPU-centric control policy may favor the GPU such that the CPU but not the GPU is throttled when the budget is exceeded; a CPU-centric control policy may favor the CPU such that the GPU but not the CPU is throttled when the budget is exceeded; an adaptive control policy may throttle both the CPU and GPU when the budget is exceeded; and a battery-centric policy may throttle the CPU and/or GPU even if the budget is not exceeded but performance is not affected, in order to extend battery life (extend the time between charges).

Different forms of each control policy may also exist to account for differences that might affect a particular policy. For example, different forms of each policy may exist to account for differences across different systems and platforms. For example, one form of a control policy may be used if the GPU heat pipe and heat exchanger are placed in front of the CPU, and another form of that control policy may be used if the order of placement is reversed.

Policy options—with regard to the choice of policy, or with regard to choices within each policy—can be made available to a user, allowing customization according to the user's personal preferences. User preferences can be stored in a user profile accessible to the thermal management system 130.

Policy options can also be specified according to operating system preferences and platform-specific (designer/manufacturer) preferences. For example, an operating system may specify different prescribed power policy schemes depending on the type of device (e.g., a laptop versus a desktop). Also, for example, the operating system can detect whether or not a battery charger is plugged in or not, and may pick either a policy to maximize battery life if the charger is plugged in or a policy to maximize performance if the charger is not plugged in.

Regarding a battery-centric policy, a priori application profiling information can be associated with each application. The application profiling can include information that identifies an application as a wasteful application. The application profiling information can also include information that indicates whether the application's performance scales more dependently on the CPU or the GPU.

Driver loading information can be used to detect when a particular application is executing. The percent utilization of the CPU and the GPU can also be measured; thus, it is possible to determine how heavily loaded the CPU and GPU are. The application profiling information, along with the other information including user profile information, can be used to identify when the e-state of the CPU or GPU can be limited without significantly affecting performance, visual experience, or quality. Thus, the thermal management system 130 can detect scenarios in which the CPU or GPU are wasting power and consequently can proactively limit wasted power without necessarily limiting performance.

In one embodiment, the management of platform cooling capabilities, platform outside skin temperature, and thermal and supply power constraints, other than those directly managed by the system 130, are manifested in the supply power budget and thermal power budget conveyed to the system 130.

In one embodiment, the control policies are implemented using a fuzzy logic control system. However, control policies can instead be implemented using a proportional control system.

In summary, according to embodiments of the invention, the responsibility for management of a CPU and a GPU can be transitioned, from the legacy system to the system 130, in response to participation of the more optimal power management system 130, and in reverse to any subsequent removal or disabling of said management. The platform can specify the supply power and thermal power budgets to the power management system whenever a substantial platform level change occurs which would affect the CPU and GPU budgets. For example, the platform can change the budgets in response to a change in platform cooling capabilities as determined by fan speed, case internal or case-external temperatures. For example, the platform can change the budgets in response to a change in platform power supply capabilities as determined by a change in power source, or a changed in power capacity limits. The management of platform cooling capabilities, platform outside skin temperature, and thermal and supply power constraints, other than those directly managed by the system 130, is manifested by the platform in the supply power budget and thermal power budget conveyed by the platform to the system 130.

Regulating Power Using a Fuzzy Logic Control System

Figure 5:
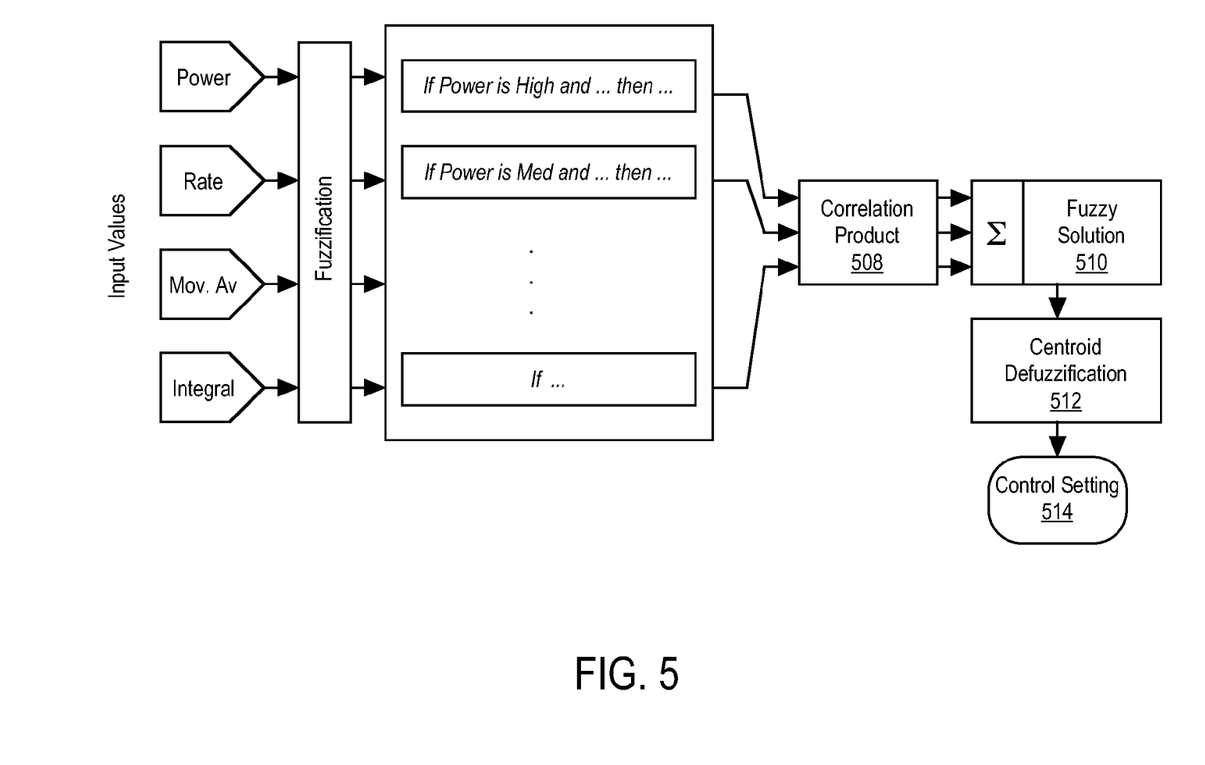
FIG. 5 is a functional block diagram showing the flow of information in an example of a fuzzy logic control system according to an embodiment of the invention.

FIG. 5 is a functional block diagram showing the flow of information in an example of a fuzzy logic control system 500 according to an embodiment of the invention. The fuzzy logic control system 500 can be implemented as part of the thermal management system 130 of FIG. 1, as computer-executable instructions residing on some form of computer-usable medium.

Figure 6:
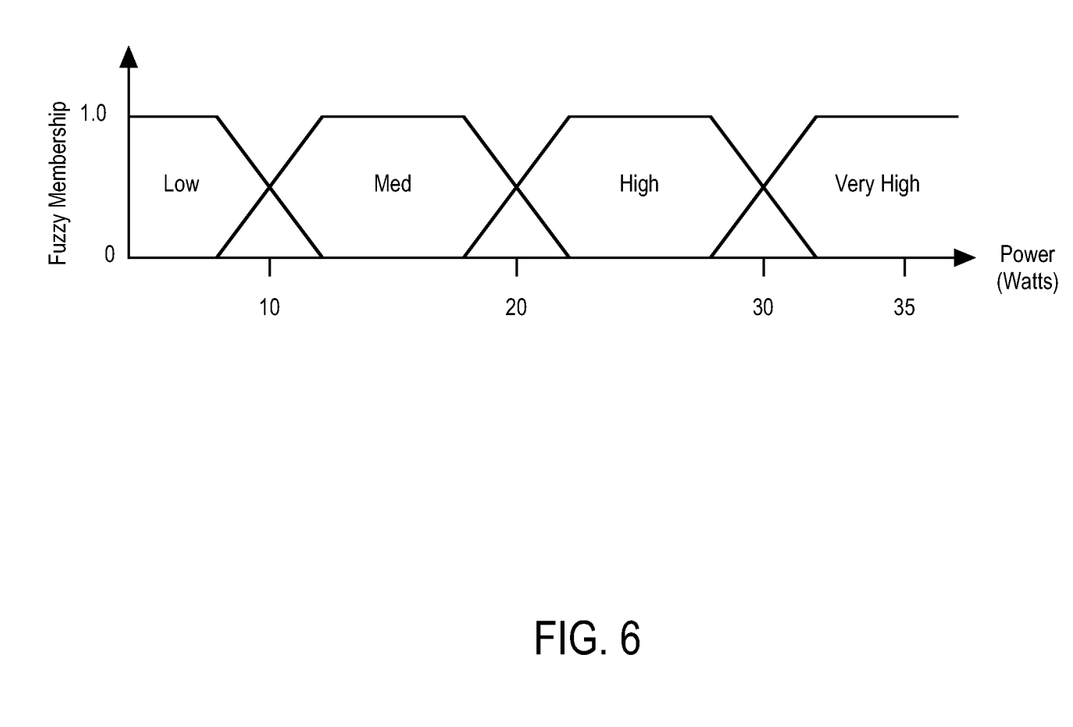
FIG. 6 illustrates an example of CPU power set membership according to an embodiment of the invention.
Figure 7:
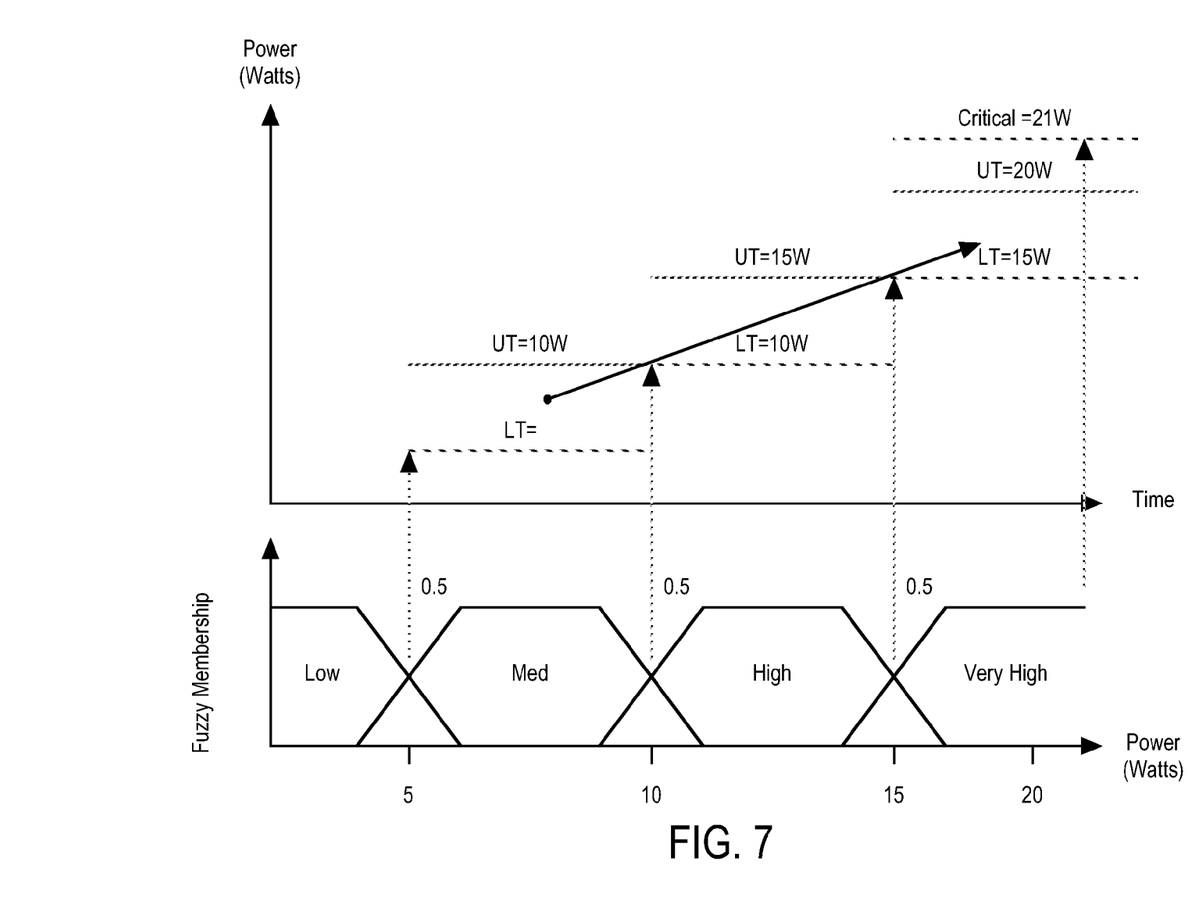
FIG. 7 illustrates the mapping of set membership to event (alarm) thresholds according to an embodiment of the invention.

In the fuzzification block 504, the input values 502 can be expressed as fuzzy value sets that describe the input values by ranges, as described further in conjunction with FIGS. 6 and 7. Examples of input values for the control system 500 include, but are not limited to: the shared budget; measured CPU and GPU power levels over sliding windows of time; the integral values of the measured power values per sample period; the rate of change of the measured and/or integral power values; and the moving average of the measured and/or integral power values. Other inputs include, but are not limited to: temperature values; identification of executing applications; application profiling information; user profile information; and CPU and GPU loading and percent utilization.

Continuing with reference to FIG. 5, the control rules 506 include a list of fuzzy logic rules which prescribe output actions for a given fuzzy set of inputs. In one embodiment, the control rules are expressed in terms of heuristics. Examples of fuzzy logic control rules are provided below for an implementation in which the GPU is favored over the CPU in a system in which the CPU heat exchanger is in front of the GPU heat exchanger:

a. If (Skin Temperature ≥ Very High)
    Reduce GPU Limit by 1 Level
    Reduce CPU Limit by 1 Level
b. If (CPU Temperature ≥ Very High)
    Reduce CPU Limit by 1 Level
c. If (GPU Temperature ≥ Very High)
    Reduce GPU Limit by 1 Level -continued

| | |
|---|---|
| d. | If (Under Shared Budget) and (CPU Temperature < High)<br>    Release CPU limits |
| e. | If (Under Shared Budget) and (GPU Temperature < High)<br>    Release GPU limits |
| f. | If (Around Shared Budget) and (Integral Burden is Near Flat) and<br>  (Skin Temperature < Very High)<br>    Do Nothing |
| g. | If (Over Shared Budget) and (Integral Burden is Flat or Positive)<br>  and (Skin Temperature < High)<br>    Do Nothing |
| h. | If (Over Shared Budget) and ((CPU temperature > High) or<br>  (Integral Burden is Over))<br>    Reduce CPU Limit by 1 Level |
| i. | If (Over Shared Budget) and ((GPU temperature > High) or<br>  (Integral Burden is Over))<br>    Reduce CPU Limit by 1 Level  // if prefer-GPU then always borrow from the CPU, don't assume it's throttled<br>    Reduce GPU Limit by 1 Level |
| j. | If (Very Over Shared Budget) and (Integral Burden is Very Over)<br>    Reduce CPU Limit by 2 Levels<br>    Reduce GPU Limit by 1 Level |

Different bodies (sets) of the control rules 506 may be defined and selectively applied to implement different control policies, such as the control policies mentioned previously herein.

As can be seen from the examples above, fuzzy logic rules introduce linguistic variables with natural language values that, as shown in the example of FIG. 7, can correspond to a range of numerical values. Accordingly, the fuzzy logic rules naturally include hysteresis; a degree of variability in the numerical inputs (e.g., the measured power values) will not necessarily result in a change to the input values 502, nor will those variations necessarily result in a change in the outcome of a rule evaluation.

In one embodiment, the control rules 506 of FIG. 5 are applied concurrently (in parallel), and the outcome (decision) from each rule is correlated in the correlation product block 508, yielding a range of control decisions that are evaluated in the solution block 510. Alternatively, the rules can be applied serially. Output actions can also be mapped to fuzzy ranges, which has the advantage of allowing the output actions to be customized for different system components and different p-states.

The centroid defuzzification block 512 maps the range of solutions to a crisp output (control) setting 514 for the particular system/platform being managed. The control setting 514 may be, for example, a throttle adjustment such as reduce (or increase) the CPU and/or the GPU p-state by one or more levels.

In one embodiment, the fuzzy logic control system 500 is executed only if a monitored parameter crosses a predefined threshold; that is, the control rules 506 are evaluated only when one of the input values used by the rules changes. As noted above, the input values may be expressed in terms of ranges; a monitored parameter may change but not by enough of an amount to fall outside a given range, in which case the input value to the control rules would not change. Additional information is provided in conjunction with FIG. 7.

The sets describing the membership of CPU and GPU component power and temperature measurements, within natural language ranges, are embedded in the platform firmware such that the control system can apply the control rules independent of the components in a specific platform.

As mentioned above, the thermal management system 130 (FIG. 1) does not require exact characterization of the system/platform being managed, nor does it require precise sensor data, especially when the thermal management system utilizes fuzzy logic control because decisions are, in general, based on ranges of input values. Furthermore, because multiple control rules can be evaluated at the same time, they tend to combine cumulatively to form the correct response. Even a rule that is not satisfied can help reinforce the correct control action—in other words, a rule may be evaluated, but the decision from that rule may not result in the need for action; however, that decision is still considered and will contribute to the selection of a particular control action.

The thermal management system 130 (FIG. 1) supports dynamic loading of the rules and set membership (ranges) from the system, allowing specific design optimization and customized behaviors of the system to be embedded within the system, and for driver updates to include control system optimizations. The sets describing the membership of CPU and GPU component power and temperature measurements, within natural language ranges, are embedded in the platform firmware such that the control system can apply the control rules independent of the components in a specific platform. Platform-specific behaviors are supported by loading the control rules from the platform firmware. Thresholds for sensor events can be determined by the fuzzy sets loaded from the platform.

FIG. 6 illustrates an example of set membership for a CPU that has p-states with maximum powers of 10, 20, 30, and 35 watts, respectively. Each p-state is mapped to a range of values and associated with a particular fuzzy logic linguistic variable; for example, the range of CPU power from about 20 to 30 watts is in the "High" set. A set membership for a GPU can be similarly defined. The ranges are flexible and readily customizable, allowing adjustment for different CPUs and GPUs, or to refine the control system, for example.

Set membership ranges can be described using trapezoids as shown in FIG. 6, meaning that the math involved in computing set membership is relatively simple fixed point multiplication and division. The CPU and GPU set memberships can be summed together, with the resulting total also expressed in set membership form (e.g., as trapezoids) to allow evaluation of cooling demands on the shared budget.

FIG. 7 illustrates the mapping of set membership to event (alarm) thresholds in the GPU power sensor 210 of FIGS. 2 and 3. GPU power ranges that map to set membership can be used to derive the event thresholds. In the example of FIG. 7, the event thresholds correspond to the half-way points on the sloped sides of the trapezoids; however, the event thresholds can be mapped to different points on the trapezoids.

Because the input conditions are expressed as range sets, it is possible to use smart sensors that produce an event signal when an interesting condition exists or when the input data has changed sufficiently. This offloads the thermal management system 130 (FIG. 1) from having to perform constant polling of the sensors in order to generate input data. Instead, whenever the CPU or GPU power crosses a threshold, an event signal (previously described herein) is generated, which ultimately ends up causing the control system 500 (FIG. 5) to evaluate the control rules 506 to determine if any control action is needed. Such mappings allow for distributed control of the power sensors, without burdening the CPU, while also reducing both the computational requirements for any power management controller and the bandwidth required for the bus to the sensors.

In the example of FIG. 7, GPU power is ramping up from seven watts to 17 watts, moving the GPU power into the "High" range. Because the GPU power has crossed at least one threshold, the GPU power sensor 210 will generate an event signal that is detected by the SMU 206 or PMU 306

(FIGS. 2 and 3). As a result of such a signal, measurement data will be read from the CPU and GPU power sensors. Ultimately, that data is used to compute an integrated power value that is compared to the shared CPU and GPU budget, as previously described herein. More specifically, the control system 500 (FIG. 5) is triggered to use the new power sensor data, as well as other current data and information, to evaluate the fuzzy logic rules and to determine and implement a control action, as needed.

With reference again to the example of FIG. 7, if instead the GPU power ramped up from seven watts to something less than ten watts, then a threshold would not have been crossed. Consequently, no event signal would be generated by the GPU power sensor, and the actions just described would not be performed (unless some other monitored fuzzy logic triggered a rules evaluation).

FIG. 7 illustrates the mapping of inputs to fuzzy ranges; output actions can also be mapped to fuzzy ranges, as mentioned above.

Fuzzy sets can also be applied to combine profile data for different applications in order to determine if the mix of executing applications depends more on the CPU or the GPU. The tendency of an application to benefit more from the CPU versus the GPU, or vice versa, is carried in application profiling information stored in the driver. When an application is detected as being active, its fuzzy classification can be combined with that of other active applications to form a majority decision with regard to whether the aggregation of applications are highly bound to the GPU, somewhat bound to the GPU, somewhat bound to the CPU, highly bound to the CPU, or evenly bound between the CPU and the GPU. This type of information is useful in determining whether it is better to throttle the CPU or the GPU first in response to a thermal excursion if both the CPU and the GPU appear to be fully utilized and at full power. If the mix of executing applications is strongly biased toward the CPU (that is, they rely computationally more on the CPU than on the GPU), then the CPU should be favored and the GPU should be throttled first, giving the CPU more of the budget; conversely, if the mix of executing applications is strongly biased toward the GPU (that is, they rely computationally more on the GPU than on the CPU), then the GPU should be favored and the CPU should be throttled first, giving the GPU more of the budget.

As another example, if an executing application is more bound to the GPU, for instance, or if the application is known to waste power while the CPU polls the GPU to determine if the GPU is finished, then the CPU may be proactively throttled to improve battery-life while retaining performance.

Figure 8:
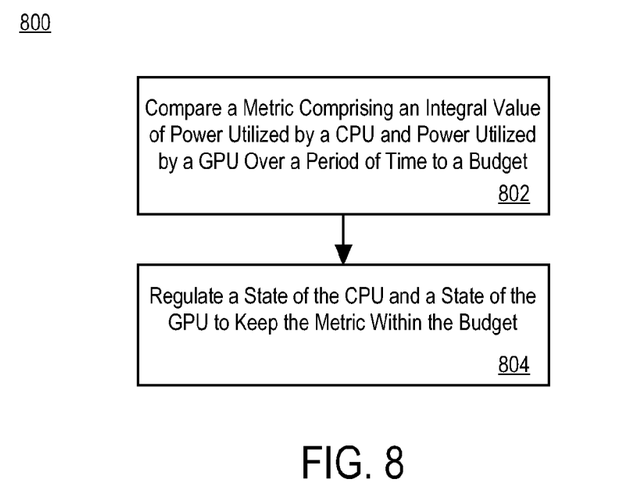
FIG. 8 is a flowchart of an example of a computer-implemented thermal management method according to embodiments of the invention.

FIG. 8 is a flowchart 800 of an example of a computer-implemented thermal management method according to an embodiment of the invention. Flowchart 800 can be implemented as computer-executable instructions residing on some form of computer-usable medium.

In block 802, a metric comprising an integral value of power utilized by a first plant (e.g., a CPU) and power utilized by a second plant (e.g., a GPU) over a period of time is compared to a budget for that period of time. In block 804, a state of the CPU and a state of the GPU are regulated to keep the metric within the budget.

Figure 9:
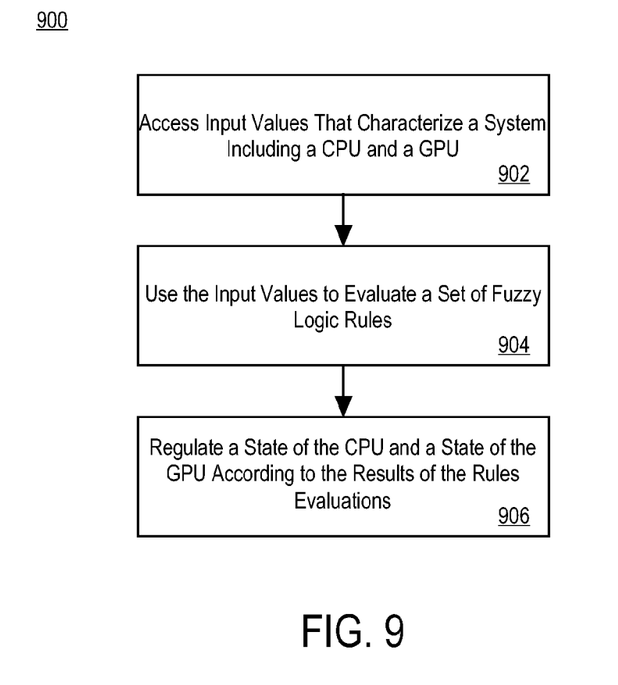
FIG. 9 is a flowchart of another example of a computer-implemented thermal management method according to embodiments of the invention.

FIG. 9 is a flowchart 900 of an example of a computer-implemented thermal management method according to another embodiment of the invention. Flowchart 900 can be implemented as computer-executable instructions residing on some form of computer-usable medium.

In block 902, input values that characterize a system in operation (e.g., the systems 200 and 300 of FIGS. 2 and 3, respectively) are accessed. In block 904, the input values are used to evaluate a set of fuzzy logic rules. In block 906, the state of the CPU and the state of the GPU are regulated according to the outcome of the rules evaluations.

Embodiments according to the present invention are thus described. While the present invention has been described in particular embodiments, it should be appreciated that the present invention should not be construed as limited by such embodiments, but rather construed according to the below claims.

What is claimed is:

1. An apparatus comprising:
   a central processing unit (CPU); and
   a graphics processing unit (GPU) communicatively coupled to the CPU;
   wherein a first thermal management system compares a metric representing a combined measure of power used by the CPU and power used by the GPU to a shared power budget, wherein a state of the CPU and a state of the GPU are regulated to maintain the metric within the shared power budget,
   wherein responsibility for managing the CPU and the GPU transitions from a legacy thermal management system of the apparatus to the first thermal management system when the first thermal management system is enabled, and transitions from the first thermal management system to the legacy thermal management system when the first thermal management system is disabled, wherein the legacy thermal management system specifies the budget to the first thermal power management system in response to an event that affects the shared power budget.

2. The apparatus of claim 1 wherein the shared power budget comprises a budget selected from the group consisting of: a shared thermal power budget; and a shared supply power budget.

3. The apparatus of claim 1 wherein the metric further comprises a prediction of a value for the metric.

4. The apparatus of claim 1 further comprising:
   a first sensor operable for measuring power used by the CPU; and
   a second sensor operable for measuring power used by the GPU, wherein the first and second sensors are operable for sending an event signal when a threshold is crossed and wherein, in response to the event signal, a management unit coupled to the first and second sensors is operable for polling the first and second sensors to access data useful for determining the metric.

5. The apparatus of claim 4 further comprising a controller operable for receiving an alert from the management unit, wherein in response to the alert the controller initiates a change to at least one of the state of the CPU and the state of the GPU.

6. The apparatus of claim 1 wherein the state of CPU and the state of the GPU also are regulated using pre-determined profile information for an executing application.

7. The apparatus of claim 1 wherein the state of the CPU and the state of the GPU also are regulated according to preferences selected from the group consisting of: user preferences; operating system preferences; and platform-specific preferences.

8. The apparatus of claim 1 further comprising a cooling fan having an adjustable fan speed, wherein the fan speed is reduced if the metric is less than the shared power budget.

9. The apparatus of claim 1 wherein the legacy thermal management system polls the first thermal management system to confirm operability of the first thermal management system.

10. The apparatus of claim 1 wherein the legacy thermal management system changes the budget in response to a change in cooling capability selected from the group consisting of: fan speed; internal temperature; and external temperature.

11. The apparatus of claim 1 wherein further the power used by the CPU and the power used by the GPU are each integral values determined for sliding and overlapping windows of time.

12. A system for managing a central processing unit (CPU) and a graphics processing unit (GPU), the system comprising:
a management unit operable for comparing a metric comprising an integral value of power utilized by the CPU and power utilized by the GPU over sliding and overlapping windows of time to a budget;
a controller coupled to the management unit and operable for regulating power used by the CPU and power used by the GPU to maintain the metric within the budget; and
a thermal control system coupled to the management unit, wherein the management unit performs a handshake with the thermal control system to relax thermal limits implemented by the thermal control system when the management unit is enabled, wherein the thermal limits are defaulted to when the management unit is not enabled, wherein the thermal control system determines the budget and conveys the budget to the management unit.

13. The system of claim 12 wherein the metric further comprises a prediction of power utilization by the CPU and by the GPU.

14. The system of claim 12 wherein the thermal control system comprises a first sensor operable to measure power used by the CPU and a second sensor operable to measure power used by the GPU, wherein the first and second sensors are operable for sending an event signal when a threshold is crossed and wherein, in response to the event signal, the management unit is operable for polling the first and second sensors to access data useful for determining the metric.

15. The system of claim 14 wherein the management unit is further operable for sending an alert to the controller, wherein in response to the alert the controller initiates a change in at least one of a state of the CPU and a state of the GPU.

16. The system of claim 15 wherein the state of the CPU and the state of the GPU also are regulated using pre-determined profile information for an executing application.

17. The system of claim 15 wherein the state of CPU and the state of the GPU also are regulated according to user preferences.

18. The system of claim 12 further comprising a cooling fan having an adjustable fan speed, wherein the fan speed is reduced if the metric is less than the budget.

19. A computer-implemented method of power control, the method comprising:
receiving, at a first thermal management system, a thermal power budget determined by a legacy thermal management system;
performing a handshake between the first thermal management system and the legacy thermal management system, wherein thermal limits implemented by the legacy thermal management system are relaxed in response to the handshake;
comparing a metric comprising an integral value of power utilized by a central processing unit (CPU) and power utilized by a graphics processing unit (GPU) over sliding and overlapping windows of time to the thermal power budget; and
regulating a state of the CPU and a state of the GPU to keep the metric within the thermal power budget, wherein responsibility for managing the CPU and the GPU transitions from the legacy thermal management system to the first thermal management system when the first thermal management system is enabled, and transitions from the first thermal management system to the legacy thermal management system when the first thermal management system is disabled.

20. The method of claim 19 wherein the metric further comprises a prediction of power utilized by the CPU and by the GPU.

21. The method of claim 19 further comprising:
receiving an event signal from at least one of a first sensor operable for measuring power used by the CPU and a second sensor operable for measuring power used by the GPU;
in response to the event signal, polling the first and second sensors to access data useful for determining the integral value; and
sending an alert that initiates a change in at least one of a state of the CPU and a state of the GPU.

22. The method of claim 19 wherein the regulating the state of the CPU and the state of the GPU comprises using information selected from the group consisting of: pre-determined profile information for an executing application, and user preferences.

23. The method of claim 19 further comprising reducing a speed of a cooling fan if the metric is less than the thermal power budget.

\* \* \* \* \*